United States Patent
Pandian et al.

(10) Patent No.: US 7,369,547 B1
(45) Date of Patent: May 6, 2008

(54) GROUP RESTART FOR SCALABLE SWITCHED ATM NETWORKS

(75) Inventors: Gnanaprakasam Pandian, Cupertino, CA (US); Karthikeyan Ramachandran, Milpitas, CA (US); Venkatesh Janakiraman, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 854 days.

(21) Appl. No.: 09/933,633

(22) Filed: Aug. 20, 2001

(51) Int. Cl.
*H04L 12/28* (2006.01)
*H04J 3/16* (2006.01)
*H04J 3/24* (2006.01)

(52) U.S. Cl. .................. 370/389; 370/397; 370/409; 370/465; 370/474

(58) Field of Classification Search .......... 370/238, 370/254–256, 389, 392, 393, 474, 409, 395.1, 370/397, 475, 252, 399, 395.3, 465
See application file for complete search history.

(56) References Cited

U.S. PATENT DOCUMENTS

| | | | |
|---|---|---|---|
| 5,748,632 A * | 5/1998 | Honda et al. ............... 370/399 |
| 5,781,529 A * | 7/1998 | Liang et al. ................ 370/218 |
| 6,292,463 B1 * | 9/2001 | Burns et al. ................ 370/216 |
| 6,304,577 B1 * | 10/2001 | Nagami et al. ............. 370/409 |
| 6,600,724 B1 * | 7/2003 | Cheng ........................ 370/256 |
| 6,721,322 B1 * | 4/2004 | Lakhani et al. .......... 370/395.1 |
| 6,822,962 B1 * | 11/2004 | Noake et al. ............ 370/395.2 |
| 6,934,283 B1 * | 8/2005 | Warner ...................... 370/380 |

* cited by examiner

*Primary Examiner*—Huy D. Vu
*Assistant Examiner*—Nittaya Juntima
(74) *Attorney, Agent, or Firm*—Campbell Stephenson LLP (57) ABSTRACT

The present invention relates to group restart in switched ATM networks. In accordance a method of one embodiment of the present invention, a first network switch receives a message (e.g., a call setup message) at one of a plurality of interfaces to the first network switch. This first network switch reads data (e.g., a group identifier) contained in the message. In response, the first network switch generates first modified data as a function of both the data of the message and first interface identifier data. The first interface identifier data corresponds to or identifies the interface at which the first network switch received the message. The first network switch replaces the data in the message with the first modified data thereby creating a first modified message. Lastly, the first network switch outputs the first modified message from another of the plurality of interfaces.

15 Claims, 10 Drawing Sheets

GROUP RESTART FOR SCALABLE SWITCHED ATM NETWORKS

BACKGROUND OF THE INVENTION

Figure 1:
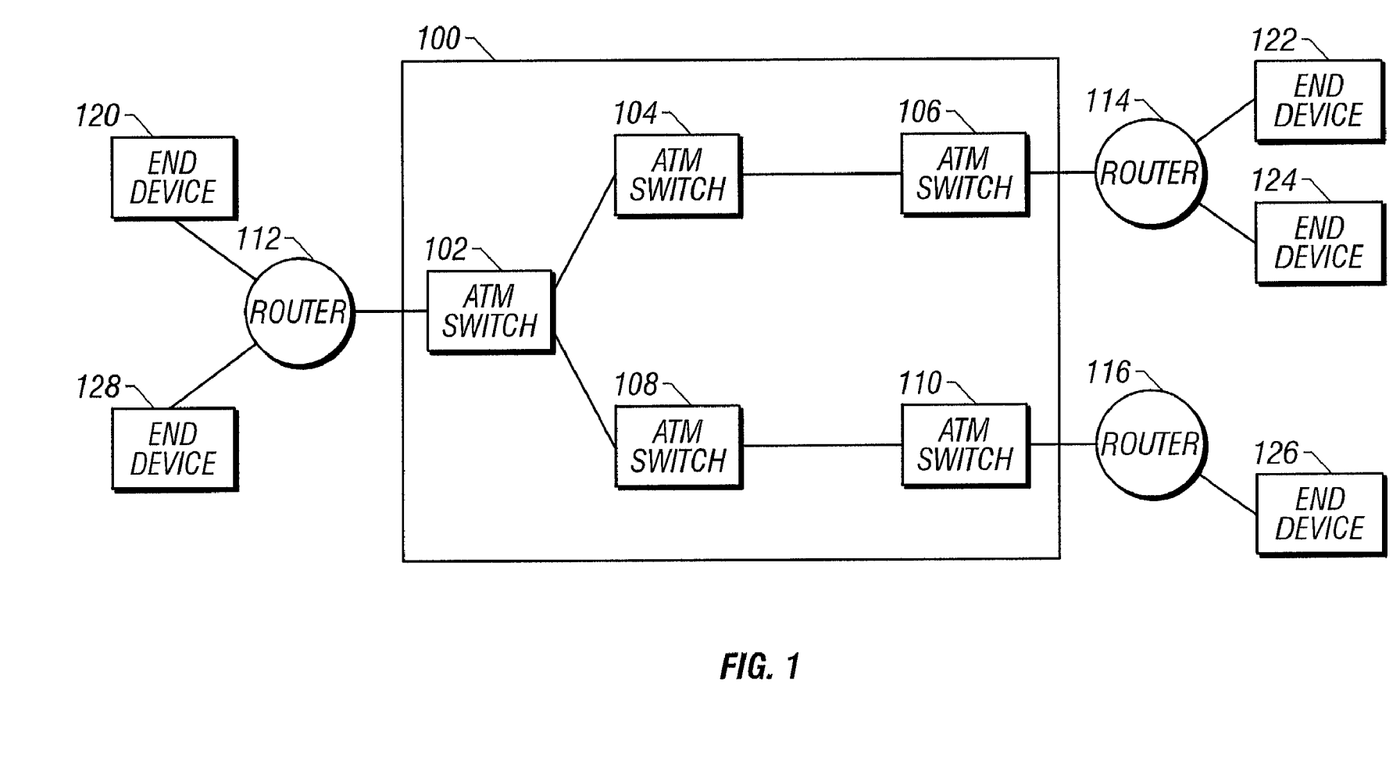
FIG. 1 illustrates an ATM network for use in data communication between end devices coupled thereto.

Asynchronous transfer mode (ATM) networks are well known in the art. FIG. 1 shows an ATM network 100 including ATM switches 102 through 110. End devices (e.g., personal computers or telephones) 120 through 128 are coupled to ATM network 100 via respective routers 112 through 116. ATM network 100 facilitates data communication between two or more of the end devices 120 through 128. For purposes of illustration, operational aspects of network 100 will be described with reference to data communication between end devices 120 and 122.

ATM switch 102, ATM switch 104 and the link therebetween are sub-components of a data communication path between end devices 120 and 122. Data communication paths facilitate an exchange of data packets between end devices. The exchange of data packets between two end devices via the data path is often referred to as a call. For each call routed through an ATM switch, the ATM switch creates and maintains a switched virtual circuit (SVC) for processing data packets. For each SVC, switches allocate internal resources including a virtual path identifier/virtual circuit identifier (VPI/VCI) and a portion of switch's data processing bandwidth. A switch may simultaneously support many different calls via separately allocated SVCs.

Each SVC, or allocation of switch resources, is mapped to a particular call via a call reference. Each call reference uniquely identifies a corresponding call. Once a call has terminated, the switch resources allocated to the terminated call should be released for latter use in a subsequent call to be established.

As the size of ATM networks increase, problems and limitations associated with connection oriented transport mechanisms come to surface. One of these problems relates to the mechanism for releasing SVCs. Often, when a call through a switch is to be terminated, the switch releases its SVC corresponding to the call, and generates a release message instructing the neighboring switches to release their SVCs corresponding to the call to be terminated. Releasing the SVCs frees resources for use in other calls. Thereafter, the neighboring switches may generate and transmit a release message to their neighboring switches instructing them to release their SVCs allocated to the terminated call. This process continues until all SVCs allocated to the terminated call have been released.

Releasing SVCs of a call works well when individual calls are terminated. However, this scheme of releasing SVCs creates problems when there is a sudden need to release a large number of SVCs. For example, suppose the link between ATM switch 104 and router 114 is supporting several calls and subsequently fails for any one of a variety of reasons. ATM switch 104 must individually release all SVCs that correspond to calls on the failed link. Additionally, ATM switch 104 must generate and transmit separate release messages to neighboring switches instructing them to release their SVCs corresponding to calls supported on the failed link. If the number of calls supported by the failed link is large, then switch 104 will generate and transmit a corresponding large number of release messages. The generation and transmission of these release messages requires substantial consumption of the switches' resources including processor bandwidth and memory allocation. Moreover, transmission of the release messages to neighboring ATM switches may flood the network and create corresponding communication problems.

SUMMARY OF THE INVENTION

The present invention relates to group restart in switched ATM networks. In accordance a method of one embodiment of the present invention, a first network switch receives a message (e.g., a call setup message) at one of a plurality of interfaces to the first network switch. This first network switch reads data (e.g., a group identifier) contained in the message. In response, the first network switch generates first modified data as a function of both the data of the message and first interface identifier data. The first interface identifier data corresponds to or identifies the interface at which the first network switch received the message. The first network switch replaces the data in the message with the first modified data thereby creating a first modified message. Lastly, the first network switch outputs the first modified message from another of the plurality of interfaces.

The method above may also include a second network switch receiving the first modified message at one of its plurality of interfaces. The second network switch reads the first modified data contained in the modified message and generates second modified data as a function of the first modified data and a second interface identifier data. The second interface identifier data corresponds to or identifies the interface of the second network switch that receives the second message. The second network switch then replaces the first modified data in the first modified message with the second modified data thereby creating a second modified message. The second network switch outputs the second modified message from another of its plurality of interfaces.

When the first and second network switches receive the message and first modified message, respectively, the first and second network switches create first and second switched virtual circuits (SVCs), respectively, for processing communication data of a particular call. The first network switch stores data (e.g., the call's reference number) relating to the first SVC into a memory location corresponding to the first modified data, while the second network switch stores data (e.g., the same reference number) relating to the second SVC into a memory location corresponding to the second data.

Additionally, the first network switch may receive a second message (e.g., a restart message) in accordance with one embodiment of the present invention after the first network switch has created a plurality of SVCs including the first SVC, each one of which processes communication data between end devices coupled to the ATM network. In response to receiving the second message, the first network switch may selectively release several of its SVCs.

Further, the second message may contain a group identifier. The first network switch may read the group identifier and generate a new group identifier as a function of the group identifier of the second message and the interface identifier data of the interface at which the first network switch received the second message. The several SVCs released by the first network switch may correspond to the new group identifier. Lastly, the first network switch may replace the group identifier in the second message with the new group identifier thereby creating a first modified second message. This first network switch may output the modified second message at another of its interfaces.

BRIEF DESCRIPTION OF THE DRAWINGS

The present invention may be better understood, and its numerous objects, features and advantages made apparent to those skilled in the art by referencing the accompanying drawings. The use of the same reference number throughout the several Figures designates a like or similar element.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

Figure 2:
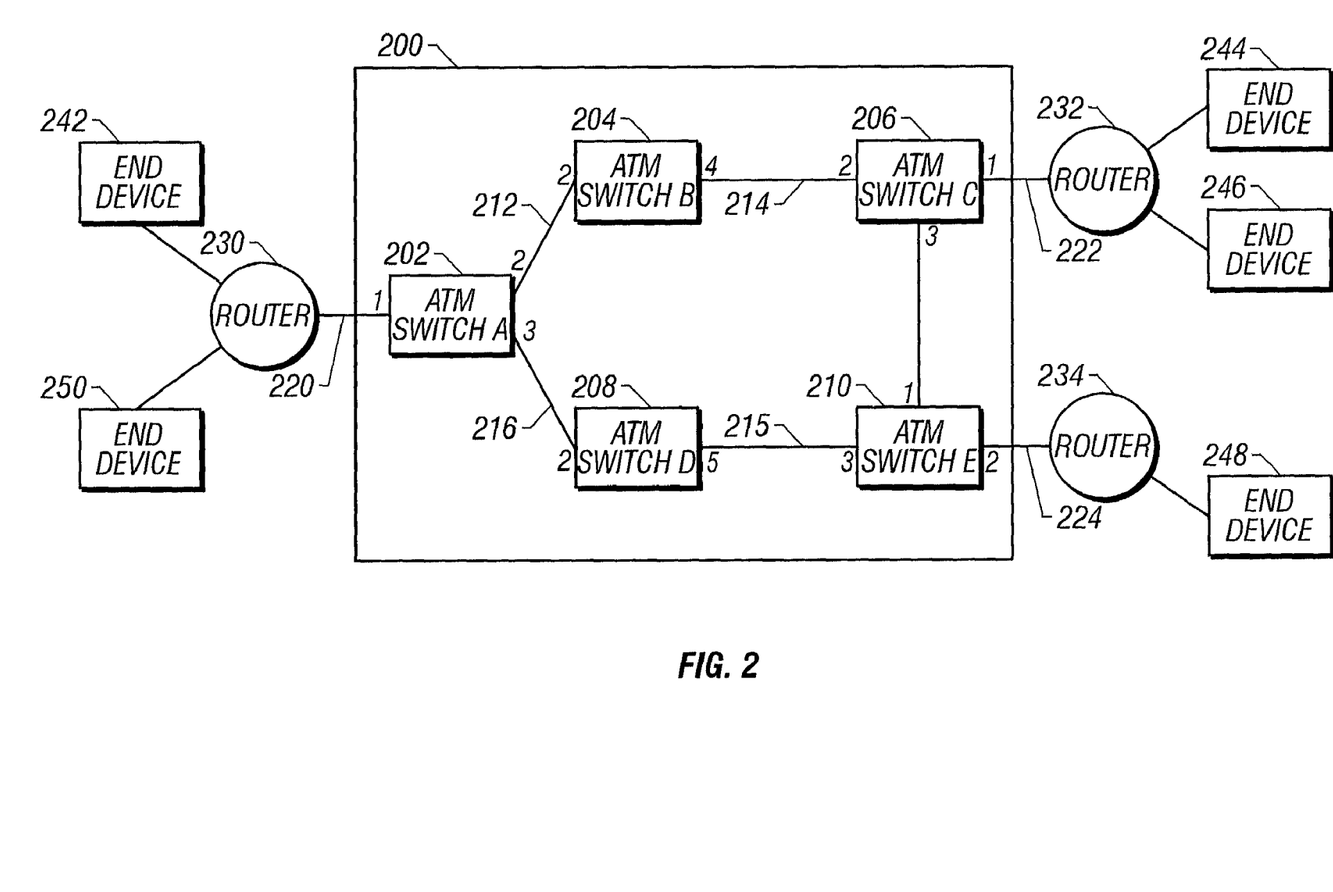
FIG. 2 illustrates an ATM network employing the present invention.

FIG. 2 illustrates in block diagram form an ATM network consisting of ATM switches 202 through 210 coupled to each other via data links 212 through 218. Additionally, FIG. 2 shows ATM network 200 coupled to end devices 242 through 250 via routers 230 through 234 and data links 220 through 224. Each of the ATM switches 202 through 210 shown in FIG. 2 includes at least two interface identifications (IDs) designating respective switch input/output interfaces through which data packets enter or exit via a corresponding data link. For example, switch 204 contains at least two interfaces designated ID 2 and ID 4 that are coupled to 212 and 214, respectively. The remaining switches shown in FIG. 2 are similarly identified by interface IDs.

Figure 3A:
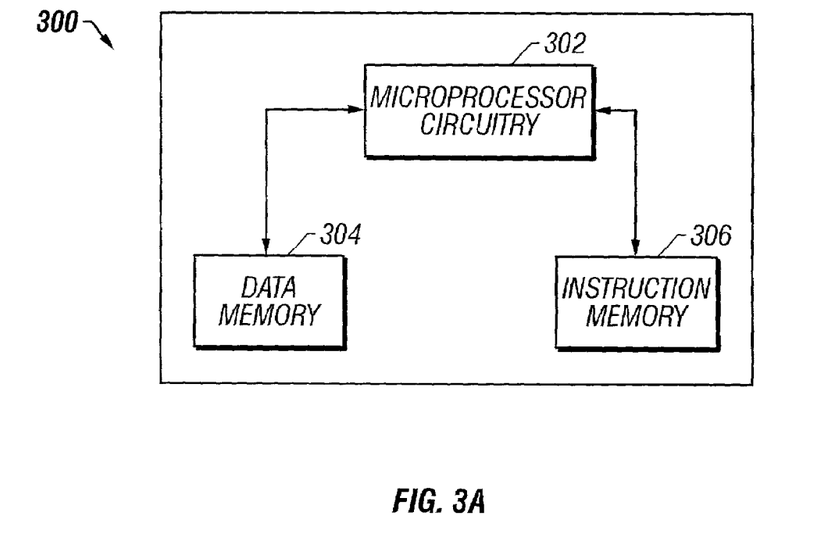
FIG. 3A illustrates a switch employable in the ATM network of FIG. 2.

FIG. 3 shows in block diagram form an exemplary embodiment of switch 206 of FIG. 2. The other switches may take similar form as switch 206 shown in FIG. 3. Switch 206 shown in FIG. 3 includes microprocessor circuitry 302 coupled to data memory 304 and instruction memory 306. One embodiment of the present invention is implemented in ATM switch 206 shown in FIG. 3 as will be more fully described below. Microprocessor circuitry 302 may include one or more microprocessors within microprocessor circuitry 302 that are configured to execute instructions stored in instruction memory 306. In one embodiment, microprocessor circuitry 302 may include one or more MIPS processors R5000 for implementing ATM signaling software and ATM routing software stored in instruction memory 306. Additionally, microprocessor circuitry 302 may execute instructions stored in memory 306 for implementing the present invention. The contents of data memory 304 will be more fully described below.

With continuing reference to FIGS. 2 and 3, ATM network 200 functions to provide data paths for calls between two or more end devices 242 through 250. ATM network 200 can establish and simultaneously maintain several distinct data paths each one of which facilitates data packet communication between two or more of the end devices 242 through 250. Communication between at least two end devices occurs with data packets transmitted between the end devices via a data path. Each data path in the ATM network 200 includes at least two ATM switches and an intervening data link.

Figure 4A:
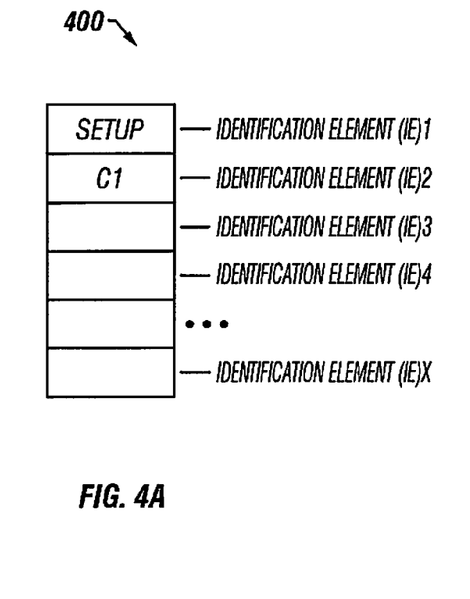
FIGS. 4A-4C illustrate setup messages generated in accordance with one embodiment of the present invention.

Before data packets of a call between, for example end devices 242 and 244 can be transmitted, a data path must be established within ATM network 200. When establishing this data path, switches receive setup messages instructing them to allocate portions of their resources for SVCs. For example, switch 206 may receive a setup message for setting up a call between end devices 242 and 244. FIG. 4A illustrates in block diagram form an exemplary setup message 400 received by switch 206. Setup message 400 includes several identification element (IE) fields IE1 through IEX in which setup message data is stored. First field IE1 identifies message 400 as a setup message. Second field IE2 of message 400 contains a call reference unique to the call to be established between end device 244 and end device 242. In the exemplary embodiment shown in FIG. 4A, the call reference is identified as C1. Fields IE3 and IE4 store a data transit list and group identifier, respectively, as will be more fully described below.

Figure 3B:
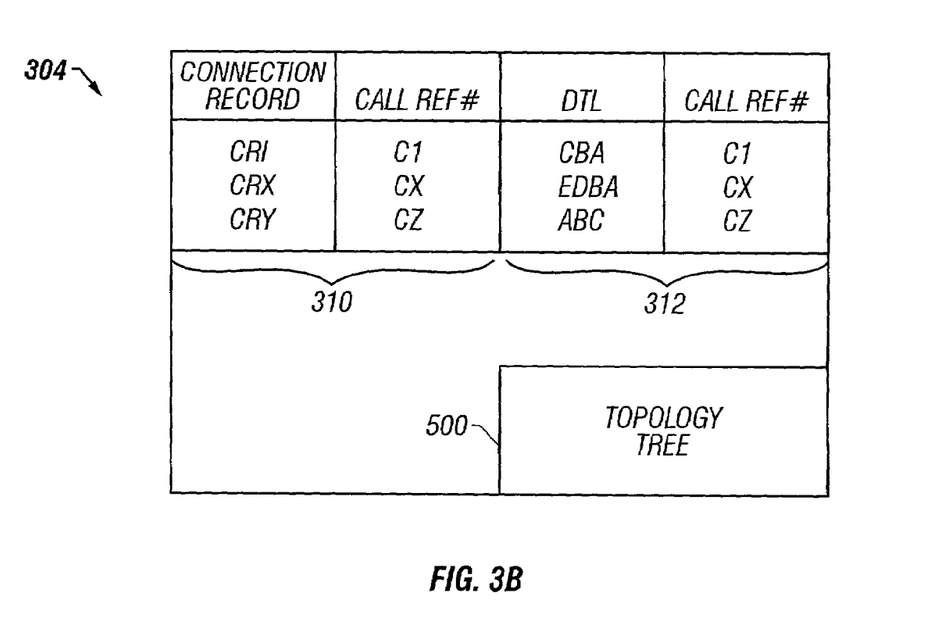
FIG. 3B illustrates one embodiment of the data memory of the switch shown in FIG. 3A.

Switch 206, in response to receiving the setup message 400 at interface ID 1, allocates resources to call C1 including a portion of the switches' data processing bandwidth, a VPI/VCI, etc, thereby creating an SVC unique to that call. The SVC resources allocated for call C1 are mapped to C1 in the data memory 304 (FIG. 3A) of switch 206. FIG. 3B shows memory 304 storing a map 310 containing several calls mapped to respective call records each of which designates a respective SVC. FIG. 3B shows C1 mapped to connection record CR1.

Figure 4B:
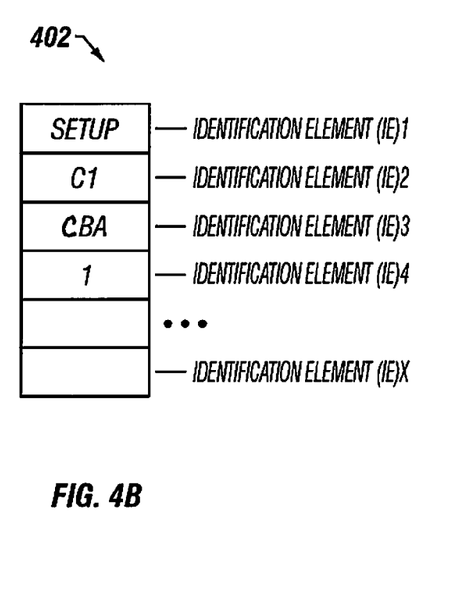

Since switch 206 is the first switch to receive the setup message 400, switch 206 calculates a data transit list (DTL) for the call. The DTL defines the path in terms of the switches within network 200 through which data packets of call C1 will be transmitted. The DTL is dynamically calculated based upon the current state of network 200 in a manner which most efficiently transmits data packets of call C1 through network 200. For example, switch 206 may calculate a most efficient data path between end devices 244 and 242 to include switches 202, 204, and 206. The DTL of this path may be defined as CBA where C represents switch 206, B represents switches 204, and A represents switch 202. In this representative data path, data packets originating with end device 244 travel sequentially through switches 206, 204, and 202 before arriving at end device 242. In contrast, data packets originating from end device 242 travel sequentially through switch 202, switch 204, and switch 206 before arriving at end device 244. Switch 206 may map DTLs to corresponding calls in memory 304. FIG. 3B shows map 312 that maps several calls to respective DTLs calculated by switch 206 or other switches including the DTL of the exemplary call C1. Switch 206 will insert the calculated DTL into IE3 of setup message 400 to create modified setup message 402 as shown in FIG. 4B.

Switch 206 may also calculate a group identifier in response to receiving the setup message 400. In general, the group identifier generated by switch 206 can be original or it can be a modification of a group identifier contained in IE4 of the received setup message. The group identifier may be a concatenation of the IDs of the switch interfaces through which switches receive a setup message when establishing a data path for a particular call. In the currently described embodiment, IE4 of the setup message 400 received by switch 206 lacks a group identifier since switch 206 is the first switch to receive the setup message for establishing a data path for the example call C1. Switch 206, in this embodiment simply stores the interface ID 1 in IE4 as an original group identifier.

Figure 5A:
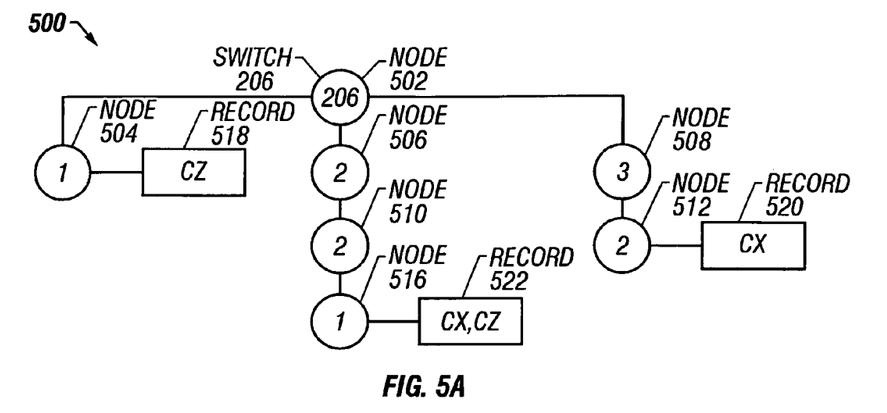
FIGS. 5A-5C illustrate topology trees generated in accordance with one embodiment of the present invention and stored in the data memory of switch 206 of FIG. 2.

As will be more fully described below, switch 206 may store the call reference C1 of setup message 400 in a topology tree data structure stored within the data memory of switch 206 either before or after updating the group identifier in IE4. The topology tree may include nodes where several call references can be enqueued. More particularly, FIG. 5A represents an exemplary topology tree 500 stored in the memory of switch 206, the topology tree 500 having a plurality of nodes 502 through 516. Additionally, topology tree 500 includes records 518 through 522 corresponding to nodes 504, 512, and 516, respectively. These records store call reference numbers of calls supported by switch 206 via SVCs thereof. Root node 502 corresponds to switch 206 shown in FIG. 2. Nodes 504 through 508 correspond to the interfaces of switch 206 designated by interface IDs 1 through 3, respectively. Node 510 corresponds to the interface of switch 204 designated by interface ID 2. Node 512 corresponds to the interface of switch 210 designated by interface ID 2.

FIG. 5A shows the state of the topology tree in switch 206 when switch 206 receives setup message 400. In response to receiving the setup message, switch 206 stores call reference C1 within the record 518 to create a modified topology tree 530 shown in FIG. 5B. Call reference is stored in record 518 of node 504 because setup message 400 was received by switch 206 at interface 1 thereof. It is noted that CX stored in record 520 is a call reference of a call supported by switch 206 the data path of which was assigned a DTL of "EDBA." Further, record 518 contains a call reference of a call supported by switch 206 the data path of which was assigned a DTL of "ABC."

Figure 4C:
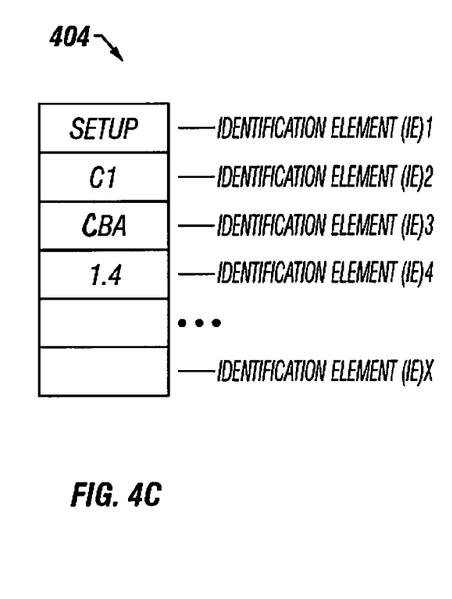
Figure 5B:
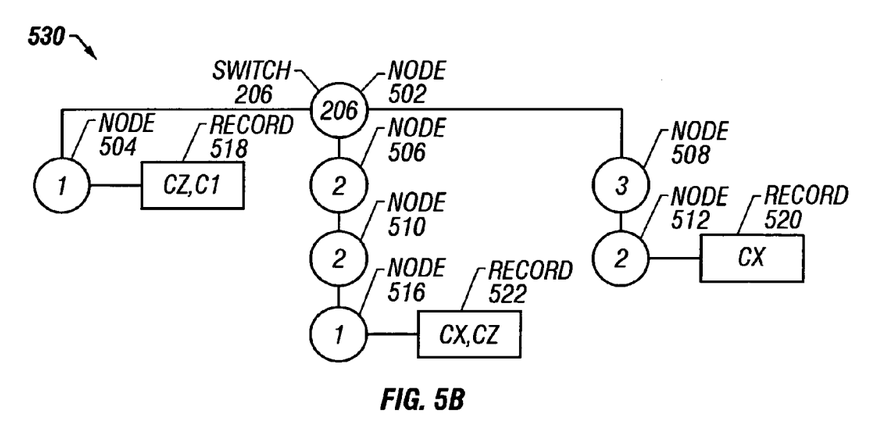

Prior to or after call reference C1 is added to record 518 as shown in FIG. 5B, switch 206 outputs setup message 402. Setup message 402 is outputted and subsequently received by switch 204 via link 214 in accordance with the DTL of message 402. In response to receiving message 402, switch 204 concatenates the group identifier of IE4 of message 402 with the ID of the interface through which switch 204 received setup message 402 thereby producing a new group identifier. Switch 204 then replaces the group identifier of message 402 field IE4 with the new group identifier thereby creating a modified message 404 shown in FIG. 4C.

Figure 6A:
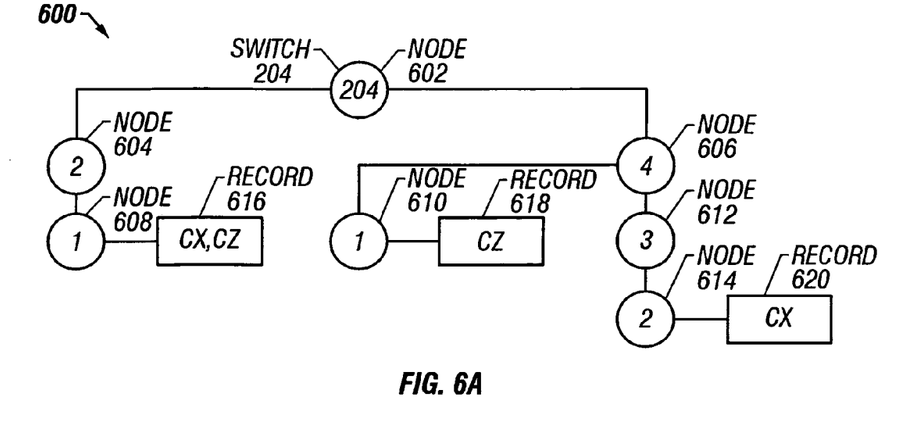
FIGS. 6A-6C illustrate topology trees generated in accordance with one embodiment of the present invention and stored in the data memory of switch 204 of FIG. 2.

FIG. 6A represents the topology tree 600 stored in the data memory of switch 204 when setup message 402 is received by switch 204. Topology tree 600 includes nodes 602 through 614 in addition to records 616 through 620. Records 616 through 620 store call references. Call record 616 corresponds to node 608, record 618 corresponds to node 610, and record 620 corresponds to node 614. Root node 602 corresponds to switch 204. Nodes 604 and 606 correspond to interfaces designated by interface ID's 2 and 4, respectively, of switch 204. Node 608 corresponds to the interface of switch 202 designated by ID 1. Node 610 corresponds to the interface of switch 206 designated by ID 1. Node 612 corresponds to the interface of switch 210 designated by interface ID 2.

Figure 6B:
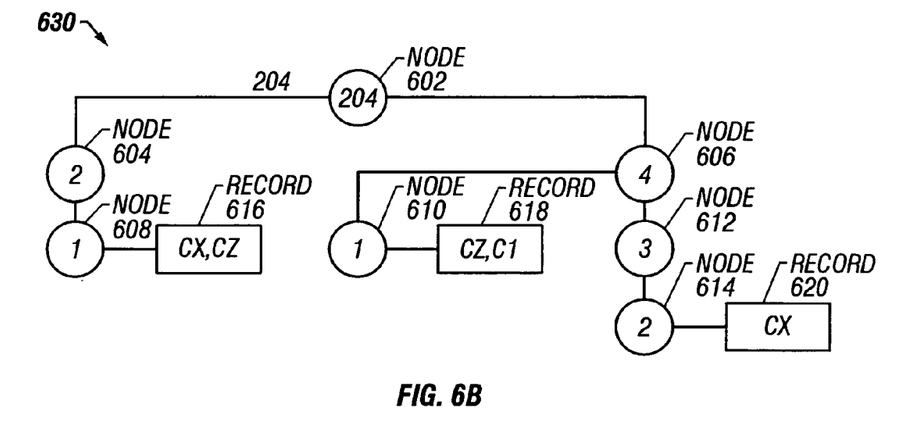

In response to receiving setup message 402 shown in FIG. 4B, switch 204 adds call reference C1 to record 618 to produce modified tree structure 630 shown in FIG. 6B. Additionally, switch 204 allocates an SVC to call C1. The SVC allocated for call C1 is mapped to C1 in the data memory of switch 204. Either before or after updating the topology tree 600, switch 204 transmits setup message 404 to switch 202 via link 212 in accordance with the DTL "CBA" in IE3.

Figure 7A:
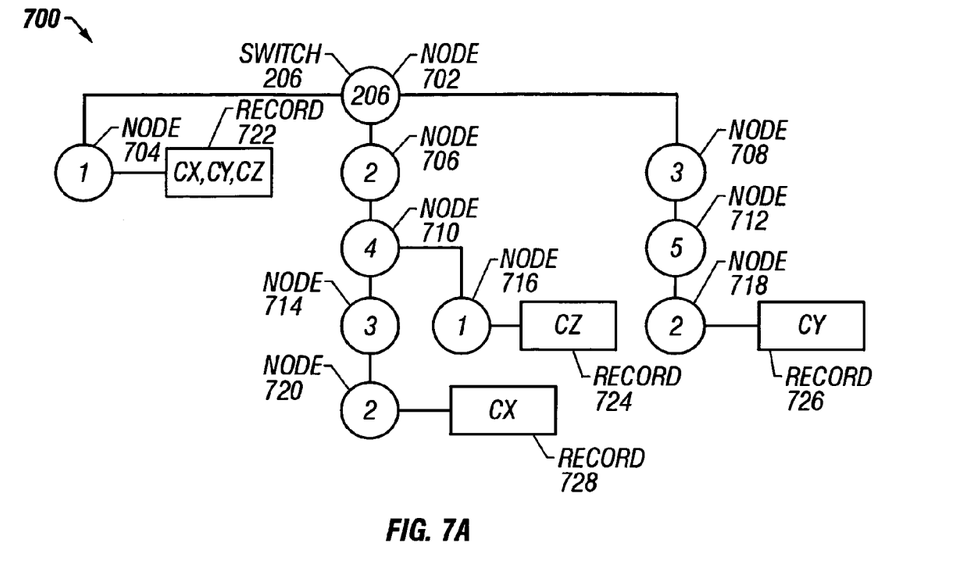
FIGS. 7A-7C illustrate topology trees generated in accordance with one embodiment of the present invention and stored in the data memory of switch 202 of FIG. 2.

Switch 202, in response to receiving the setup message 404 at interface 2, allocates resources and to create a unique SVC. The SVC resources allocated for call C1 are mapped to C1 in the data memory of switch 202. Also, switch 202 updates the tree topology stored in data memory thereof. FIG. 7A represents the topology tree 700 stored in the data memory of switch 202 when switch 202 receives setup message 404. Topology tree 700 includes nodes 702 through 720 in addition to records 722 through 728. It is noted that records 722 through 728 correspond to nodes 704, 716, 718, and 728, respectively. Record 722 contains call references CX, CY, and CZ. Record 724 includes call reference CZ. Record 726 includes call reference CY. Record 728 includes call reference CX. It is noted that call reference CY corresponds to a call with a DTL assigned as "ACE." Root node 702 corresponds to switch 202 while nodes 704 through 708 correspond to interfaces of switch 202 designated 1, 2, and 3 respectively. Node 710 corresponds to interface 4 of switch 204, node 712 corresponds to interface 5 of switch 208, node 714 corresponds to interface 3 of switch 206, node 716 corresponds to interface 1 of switch 206, node 718 corresponds to interface 2 of switch 210, and node 720 corresponds to interface 2 of switch 210.

Figure 7B:
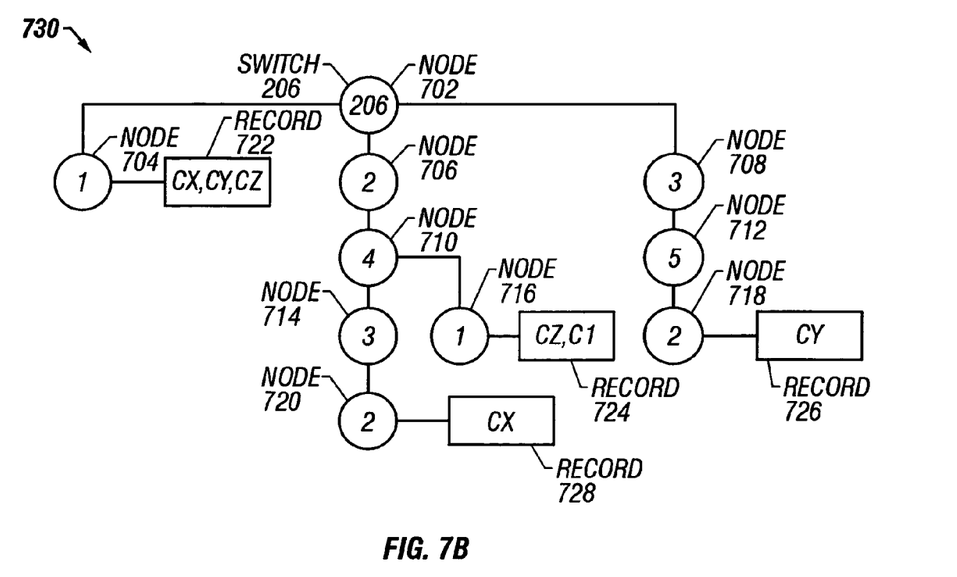

In response to receiving setup message 404, switch 202 updates topology tree 700 by adding C1 to record 724 thereby producing the modified tree topology 730 shown in FIG. 7B. It is noted that record 724 corresponds to node 716 which branches from node 710 which branches from node 706, the node of switch 202 that received setup message 404. Placing call reference C1 in record 724 reflects the propagation of the setup messages through network 200 for establishing the data path for call C1. Stated differently, call reference C1 is stored in record 724 to reflect the fact that the setup message 400 was initially received at interface 1 of switch 206, and subsequently twice modified and forwarded first to switch 204 via interface 4 thereof and then to switch 202 via interface 2 thereof. The propagation of the startup message sequentially through interfaces 1, 4, and 2 of switches 206, 204, and 202, respectively, reflects topology tree 700 structure that node 716, corresponding to interface 1 of switch 206, branches from node 710 corresponding to interface 4 of switch 204, which branches from node 706, corresponding to interface 2 of switch 202.

Figure 8A:
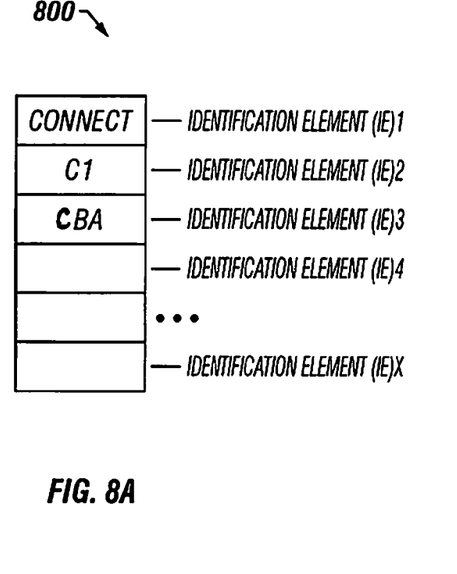
FIGS. 8A-8C illustrate connect acknowledgment messages generated in accordance with one embodiment of the present invention.

Before end devices 244 and 242 begin exchanging communication packets via the data path established in network 200, the end device 242 called may initiate a connection acknowledgement procedure to notify the calling end device 244 that the data path therebetween has been established. In accordance with the connection acknowledgement procedure, switch 202 may receive a connect message at interface 1 thereof. FIG. 8A shows an exemplary connect message 800 received by switch 202. Connect message 800 includes a plurality of fields designated IE1 through IEX. IE1 defines that message 800 is a connect acknowledgment message. IE2 defines the call reference number which corresponds to the call whose connection is being acknowledged. IE3 contains the DTL for the data path between the end devices for the corresponding call.

In response to switch 202 receiving connect message 800, switch 202 may calculate a group identifier for the connect message. Like the group identifier generated for the setup message described above, each switch can generate a group identifier by concatenating the contents of IE4 with the interface ID on which the switch receives the connect message. The result of this concatenation replaces the contents of IE4 thereby producing a new connect message to be forwarded to the next switch identified in the DTL list of IE3.

In the currently described embodiment, IE4 of the connect message 800 received by switch 202 lacks a group identifier since switch 202 is the first switch to receive the connect message for acknowledging the data path setup between end devices 242 and 244. Switch 202, in this embodiment simply stores the interface ID 1 in IE4 as an original group identifier thereby producing modified connect message 802 shown in FIG. 8B. Additionally, switch 202 updates its topology tree stored in its data memory. More particularly, switch 202 adds the call reference of connect message 800 to record 722 shown in FIG. 7B to produce tree 740 shown in FIG. 7C. Eventually switch 202 transmits the updated connect message 802 shown in FIG. 8B to switch 204 via link 212 in accordance with the reverse order of the DTL contained in IE3.

Figure 8B:
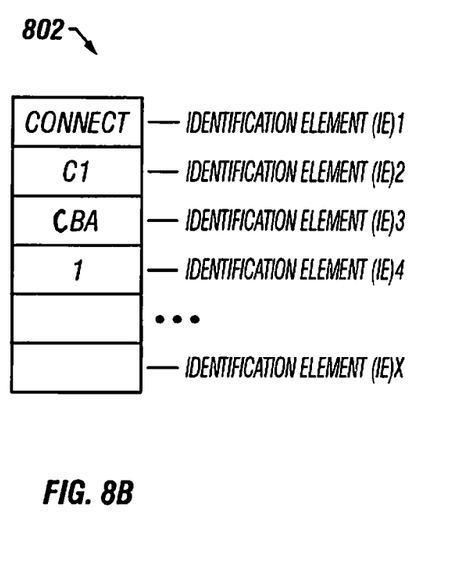
Figure 8C:
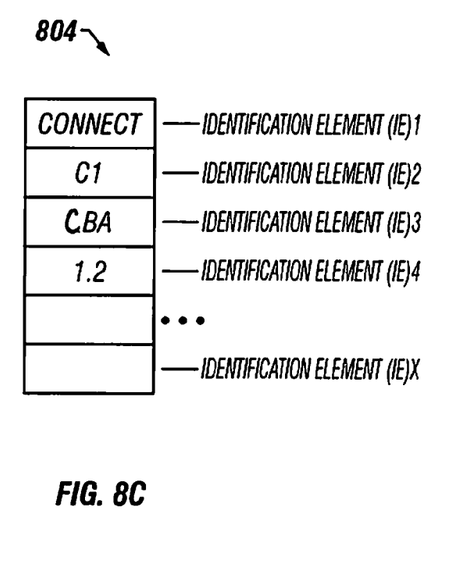

Switch 204, in response receiving connect message 802, concatenates the interface ID 2 of the interface upon which switch 204 received connect message 802 with the contents of IE4 thereof. The result of this concatenation is stored within IE4 of connect message 802 thereby generating a modified connect message 804 as shown in FIG. 8C. Additionally, in response to receiving connect message 802, switch 204 updates topology tree 602 by adding call reference C1 of the connect message 802 into record 616 to produce modified tree 640 shown in FIG. 6C. Eventually switch 204 transmits the modified connect message 804 to switch 206 in accordance with the reverse order of the DTL.

Switch 206, in response to receiving connect message 804, may concatenate the contents of IE4 thereof with the interface ID 2 which designates the interface of switch 206 that received connect message 804. Additionally, switch 206 updates topology tree 530. More particularly, switch 206 adds the call reference C1 of the connect message to record 522 to produce modified tree 540 shown in FIG. 5C.

As noted in the background, problems arise in prior art networks when, for example, a link to an ATM switch suddenly fails and the failed link supports many calls. As noted above, switches in prior systems respond by generating individual release messages for releasing SVCs for calls supported on the failed link. This generation of release messages substantially burdens the processing power of the switches in addition to potentially flooding network 200.

Figure 5C:
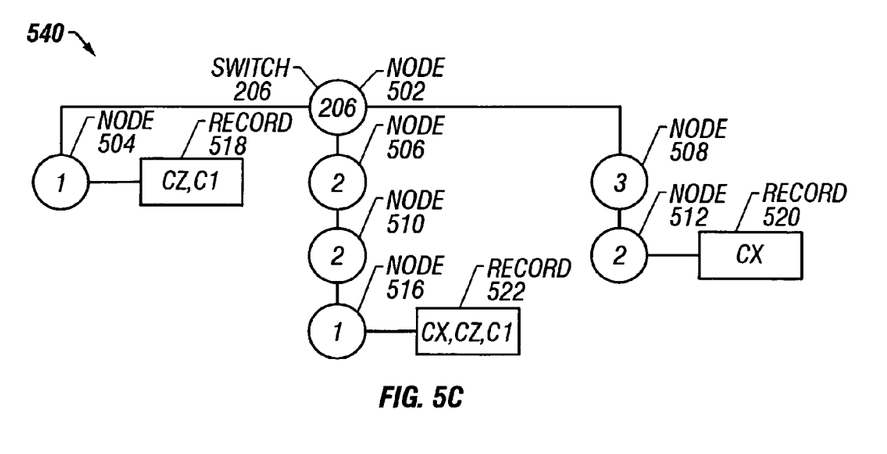
Figure 6C:
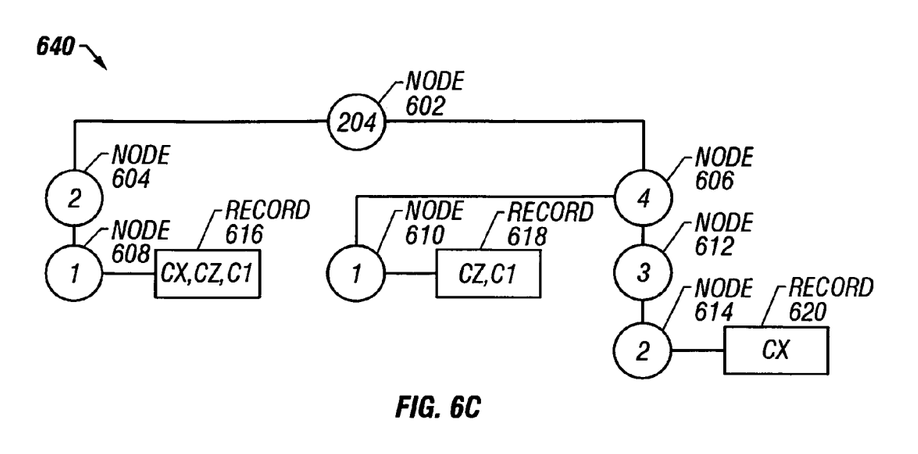
Figure 7C:
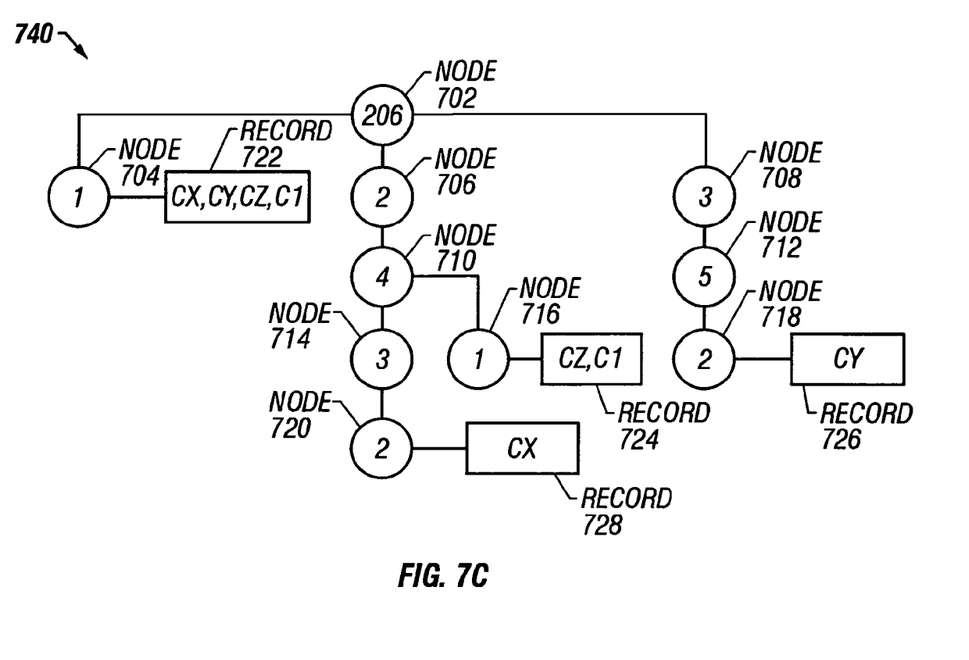

The call records corresponding to the nodes of the topology trees shown in FIGS. 5C, 6C, and 7C directly or indirectly identify calls that are supported by data links coupled to the switches. These records can be used to efficiently release SVCs allocated to calls supported on a data link that suddenly fails. The SVCs can be released without the switches generating and potentially flooding the ATM network 200 with a large number of release messages.

The topology trees described above can support a mechanism whereby a single group release or restart message can be generated by a switch connected to a link that suddenly fails, wherein the single group release or restart message can be used to release multiple SVCs in other switches for calls that were supported on the failed link. The terms group release and restart will be used interchangeably. In contrast to generating individual release messages, the processing power of a switch node will not be burdened by the generation of a single restart message which can be used to release groups of SVCs in other switches. Moreover, transmitting restart messages, as opposed to transmitting individual release messages, will reduce the risks of flooding the network.

To illustrate, suppose switch 206 detects a failure of link 222 through which data packets of call C1 and other calls are being transmitted. Switch 206 detects the failure and in response, switch 206 may generate the restart message 900 shown in FIG. 9A. Restart message 900 includes fields designated by IE1 through IEX. Field IE1 indicates that message 900 is a restart message. Switch 206 stores in field IE2 the interface ID of the interface coupled to the failed link. In this case, switch 206 stores interface ID 1 in IE2.

Figure 9A:
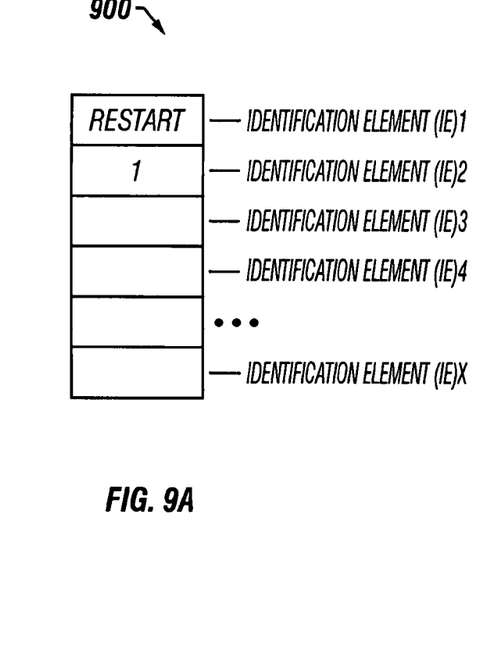
FIGS. 9A-9C illustrate restart messages generated in accordance with one embodiment of the present invention.

Additionally, with reference to FIG. 5C, switch 206 will release all SVCs mapped to call references in records (e.g., record 518) corresponding to node 504 or nodes below node 504, since node 504 corresponds to the interface 1 connected to the failed data link. In this case switch 206 reads the content of record 518, accesses a table in its data memory which maps calls CZ and C1 of record 518 to SVC resources, and releases these mapped SVCs. The records corresponding to node 504 or nodes below node 504 are subsequently cleared. Switch 206 may also delete all other instances of call references C1 and CZ in other records corresponding to nodes in tree 540. In this manner, switch 206 releases SVCs for calls corresponding to the group identifier 1 in IE2 of restart message 900.

Figure 9B:
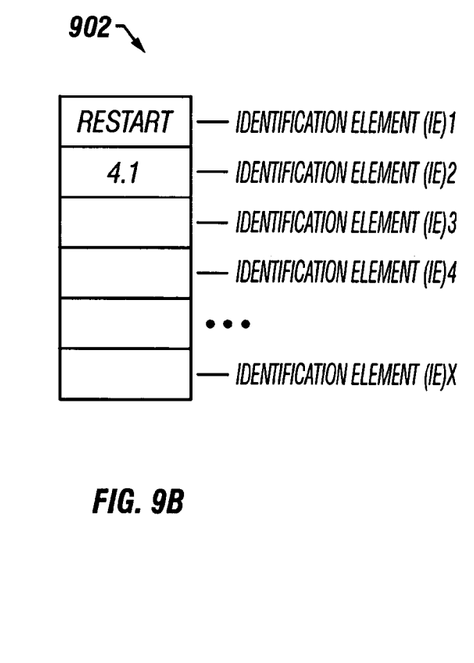

Eventually, switch 206 transmits restart message 900 to all neighboring switches including switches 204 and 210. These switches, in turn, update the group identifier of field IE2 in accordance with the interface ID of the interface which received the restart message 900. For example, switch 204 upon receiving restart message 900 concatenates the group identifier 1 stored in IE2 with the interface ID 4 of the interface of switch 204 that received message 900 thereby generating a new group identifier 4·1. The new group identifier replaces the contents of IE2 thereby producing a modified restart message 902 shown in FIG. 9B.

Switches that receive and modify restart message 900 will release SVCs that correspond to the group identifier of the modified restart message. For example, with reference to FIG. 6C, switch 204 will release all SVCs mapped to call references in records (e.g., record 618) corresponding to node 610 or nodes below node 610, since node 610 corresponds to the group identifier 4·1 in modified restart message 902. In this case switch 204 reads the call references C1 and CZ of record 618, accesses the table in its data memory which maps calls C1 and CZ to SVC resources, and releases SVCs mapped to calls CZ and C1. The records corresponding to node 610 or nodes below node 610 are subsequently cleared. Switch 204 may also delete all other instances of call references C1 and CZ in records corresponding to nodes in tree 640. In this manner, switch 204 releases SVCs for calls corresponding to the group identifier in IE2 of restart message 902.

Figure 9C:
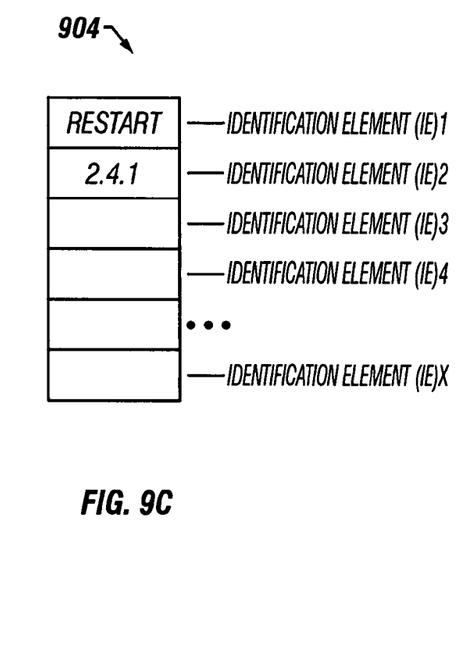

Eventually, switch 204 transmits restart message 902 to all neighboring switches including switch 202. Switch 204 may refrain from transmitting restart message 902 to switch 206 since restart message 900 was received from switch 206. The switches that do receive restart message 902, in turn, update the group identifier of field IE2 in accordance with the interface ID of the interface which received the restart message 900. For example, switch 202 upon receiving restart message 902 concatenates the group identifier 4·1 stored in IE2 with the interface ID 2 of the interface of switch 202 that received message 902 thereby generating a new group identifier 2·4·1. This new group identifier replaces the contents of IE2 of restart message 902 thereby producing a modified restart message 904 shown in FIG. 9C.

Switches that receive and modify restart message 902 will release SVCs that correspond to the group identifier subsequently modified. For example, with reference to FIG. 7C, switch 202 will release all SVCs mapped to call references in records (e.g., record 724) corresponding to node 716 or nodes below node 716, since node 716 corresponds to the group identifier 2·4·1 in restart message 904. In this case switch 202 reads the call references C1 and CZ of record 724, accesses the table in its data memory which maps calls C1 and CZ to SVC resources, and releases SVCs mapped to calls CZ and C1. The records corresponding to node 724 or nodes below node 716 are subsequently cleared. Switch 202 may also delete all other instances of call references C1 and CZ in records corresponding to nodes in tree 740. In this manner, switch 202 releases SVCs for calls corresponding to the group identifier in IE2 of restart message 904.

In another embodiment, the group identifier contained in the restart message could be a list of all call references corresponding to switch resources to be released. This group identifier could be distributed throughout the network switches via the restart message, and each switch that receives the restart message could access its map 310 to determine if the switch has SVCs allocated to call references in the group identifier list.

Although the present invention has been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. A method comprising:
 a first network switch receiving a message at one of a plurality of interfaces to the first network switch, wherein the message comprises data;
 the first network switch generating first data as a function of both the data and first interface identifier data, wherein the first interface identifier data corresponds to the one of the plurality of interfaces to the first network switch and wherein generating the first data comprises concatenating the first interface identifier data with the data;
 the first network switch replacing the data in the message with the first data thereby creating a first modified message;
 the first network switch outputting the first modified message at another of the plurality of interfaces to the first network switch;
 a second network switch receiving the first modified message at one of a plurality of interfaces to the second network switch;
 the second network switch generating second data as a function of the first data and a second interface identifier data, wherein the second interface identifier data corresponds to the one of the plurality of interfaces to the second network switch;
 the second network switch replacing the first data in the first modified message with the second data thereby creating a second modified message;
 the second network switch outputting the second modified message from another of the plurality of interfaces to the second network switch;
 the first network switch receiving a second message, wherein the first network switch comprises a plurality of switched virtual circuits each one of which processes communication data;
 the first network switch releasing several of the plurality of switched virtual circuits in response to first network switch receiving the second message.

2. The method of claim 1 further comprising:
 the first network switch creating a first switched virtual circuit (SVC) for processing communication data, wherein the first SVC is created in response to receiving the message comprising the data;
 the first network switch storing data relating to the first SVC into a memory location, wherein the memory location corresponds to the first data.

3. The method of claim 1 further comprising:
 the first network switch creating a first switched virtual circuit (SVC) for processing communication data, wherein the first SVC is created in response to the first network switch receiving the message comprising the data;
 the first network switch storing data relating to the first SVC into a memory location in the first network switch, wherein the memory location in the first network switch corresponds to the first data;
 the second network switch creating a second SVC for processing communication data, wherein the second SVC is created in response to the second network switch receiving the first modified message;
 the second network switch storing data relating to the second SVC into a memory location in the second network switch, wherein the memory location in the second network switch corresponds to the second data.

4. The method of claim 1 further comprising:
 the first network switch allocating a portion of its data processing resources to process communication data, wherein the first network switch allocates the portion of its data processing resources in response to receiving the message comprising the data;
 the first network switch storing data relating to the allocated portion of its data processing resources into a memory location, wherein the memory location corresponds to the first data.

5. The method of claim 1 wherein the message comprising the data comprises call reference data, and wherein the method further comprises the first network switch copying the call reference data into a memory location, wherein the memory location corresponds to the first data.

6. The method of claim 5 further comprising:
 the first network switch creating a first SVC for processing communication data transmitted between at least two end devices coupled to the first network switch;
 the first network switch mapping the first SVC to the call reference data.

7. A method comprising:
 a first network switch receiving a message at one of a plurality of interfaces to the first network switch, wherein the message comprises data;

the first network switch generating first data as a function of both the data and first interface identifier data, wherein the first interface identifier data corresponds to the one of the plurality of interfaces to the first network switch;

the first network switch replacing the data in the message with the first data thereby creating a first modified message;

the first network switch outputting the first modified message at another of the plurality of interfaces to the first network switch;

the first network switch detecting a failure in a data link coupled to the one of the plurality of interfaces to the first network switch;

the first network switch generating a restart message comprising a plurality of fields in response to detecting the failure, wherein one of the plurality of fields contains the first interface identifier data, and;

the first network switch outputting the restart message from several of the plurality of interfaces.

8. A method comprising:

a first network switch receiving a message at one of a plurality of interfaces to the first network switch, wherein the message comprises data;

the first network switch generating first data as a function of both the data and first interface identifier data, wherein the first interface identifier data corresponds to the one of the plurality of interfaces to the first network switch;

the first network switch replacing the data in the message with the first data thereby creating a first modified message;

the first network switch outputting the first modified message at another of the plurality of interfaces to the first network switch;

the first network switch receiving a second message, wherein the second message comprises second data, wherein the first network switch comprises a plurality of switched virtual circuits (SVCs) each one of which processes communication data;

the first network switch generating third data as a function of the second data and the first interface identifier data;

the first network switch releasing several of the plurality of SVCs in response to first network switch receiving the second message, wherein the several of the plurality of SVCs correspond to the third data.

9. The method of claim 8 wherein the second message is received by the first network switch at the one of the plurality of interfaces thereof, wherein the method further comprises:

the first network switch replacing the second data in the second message with the third data thereby creating a first modified second message;

the first network switch outputting the first modified second message at another of the plurality of interfaces to the first network switch.

10. A method comprising:

a first network switch receiving a message at one of a plurality of interfaces to the first network switch, wherein the message comprises data;

the first network switch generating first data as a function of both the data and first interface identifier data, wherein the first interface identifier data corresponds to the one of the plurality of interfaces to the first network switch;

the first network switch replacing the data in the message with the first data thereby creating a first modified message;

the first network switch outputting the first modified message at another of the plurality of interfaces to the first network switch;

the first network switch receiving a restart message comprising a field having a group identifier contained therein, wherein the restart message is received on the one of the plurality of interfaces to the first network switch, and wherein the first network switch comprises a memory that stores records containing call references each of which is mapped to a respective portion of the first network switch's processing bandwidth;

the first network switch generating a new group identifier as a function of the first interface identifier data and the group identifier;

the first network switch deallocating all portions of its processing bandwidth respectively mapped to call references stored in one or more of the records corresponding to the new group identifier;

the first network switch replacing the group identifier of the restart message with the new group identifier thereby generating a modified restart message;

the first network switch outputting the modified restart message at the another of the plurality of interfaces to the first network switch.

11. A computer readable medium comprising instructions executable by a processor contained in a network switch to implement a method, the method comprising:

reading data contained in a message received by the network switch at one of a plurality of interfaces thereof, wherein the message comprises the data;

generating first data as a function of the data and first interface identifier data, wherein the first interface identifier data corresponds to the one of the plurality of interfaces to the network switch;

replacing the data in the message with the first data thereby creating a first modified message;

outputting the first modified message to another of the plurality of interfaces to the network switch;

creating a plurality of SVCs each one of which processes communication data;

selectively releasing several of the plurality of SVCs in response to the network switch receiving a second message;

reading second data contained in the second message, wherein the second message is received by the network switch at the one of the plurality of interfaces thereof;

generating third data as a function of the second data and the first interface identifier data;

replacing the second data in the second message with the third data thereby creating a first modified second message;

outputting the first modified second message at another of the plurality of interfaces to the network switch.

12. The computer readable medium of claim 11 wherein the method the step of creating the plurality of SVCs further comprises:

the network switch creating a first switched virtual circuit (SVC) for processing communication data, wherein the first SVC is created in response to receiving the message comprising the data;

storing data relating to the first SVC into a memory location, wherein the memory location corresponds to the first data.

13. The computer readable medium of claim 11 wherein the several of the plurality of SVCs released by the first network switch correspond to the third data.

14. The computer readable medium of claim 11 wherein generating the first data comprises concatenating the first interface data with the data.

15. A method comprising:
- a first network switch receiving a message at one of a plurality of interfaces to the first network switch, wherein the message comprises data;
- the first network switch generating first data as a function of both the data and a first interface identifier, wherein the first interface identifier corresponds to the one of the plurality of interfaces of the first network switch;
- the first network switch releasing one or more switched virtual circuits (SVCs) corresponding to the first data;
- the first network switch replacing the data in the message with the first data thereby creating a first modified message;
- the first network switch outputting the first modified message at another of the plurality of interfaces to the first network switch;
- the first network switch receiving a second message, wherein the first network switch comprises a plurality of switched virtual circuits each one of which processes communication data; and
- the first network switch releasing several of the plurality of switched virtual circuits in response to first network switch receiving the second message.

* * * * *